(12) United States Patent
Guard et al.

(10) Patent No.: US 9,304,617 B2
(45) Date of Patent: Apr. 5, 2016

(54) MESH DESIGN FOR TOUCH SENSORS

(71) Applicants: David Brent Guard, Southampton (GB); Steven P. Emm, Southampton (GB)

(72) Inventors: David Brent Guard, Southampton (GB); Steven P. Emm, Southampton (GB)

(73) Assignee: Atmel Corporation, San Jose, CA (US)

( * ) Notice: Subject to any disclaimer, the term of this patent is extended or adjusted under 35 U.S.C. 154(b) by 239 days.

(21) Appl. No.: 14/031,372

(22) Filed: Sep. 19, 2013

(65) Prior Publication Data

US 2015/0077349 A1 Mar. 19, 2015

(51) Int. Cl.
G06F 3/041 (2006.01)
G06F 3/044 (2006.01)
G06F 3/047 (2006.01)

(52) U.S. Cl.
CPC ............... *G06F 3/041* (2013.01); *G06F 3/044* (2013.01); *G06F 3/047* (2013.01); *G06F 3/0412* (2013.01); *G06F 2203/04112* (2013.01)

(58) Field of Classification Search
CPC .......... G06F 3/044; G06F 2203/04112; G06F 3/0412; G06F 3/041; G06F 3/047
See application file for complete search history.

(56) References Cited

U.S. PATENT DOCUMENTS

| | | | |
|---|---|---|---|
| 5,329,577 A | 7/1994 | Norimatsu | |
| 6,262,704 B1 * | 7/2001 | Kurumisawa et al. | 345/98 |
| 6,781,647 B2 | 8/2004 | Fujieda | |
| 6,813,957 B1 * | 11/2004 | Platz | 73/780 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,493,347 B2 | 7/2013 | Chen | |
| 8,519,967 B2 | 8/2013 | Chien | |
| 8,591,279 B1 | 11/2013 | Cok et al. | |
| 8,692,795 B1 | 4/2014 | Kremin | |
| 8,692,802 B1 | 4/2014 | Maharyta | |

(Continued)

FOREIGN PATENT DOCUMENTS

WO WO 2012/129247 A2 12/2012

OTHER PUBLICATIONS

U.S. Appl. No. 13/910,055, filed Jun. 4, 2013, Guard.

(Continued)

*Primary Examiner* — Michael J Eurice
(74) *Attorney, Agent, or Firm* — Baker Botts L.L.P.

(57) ABSTRACT

In one embodiment, an apparatus includes a touch sensor including a mesh of multiple first lines and second lines of conductive material extending across a display. The first lines are substantially parallel to each other. The second lines are substantially parallel to each other. The display includes multiple pixels that each include sub-pixels. Each of the pixels has a first pixel pitch along a first axis and a second pixel pitch along a second axis that is perpendicular to the first axis. Each of the sub-pixels has a first sub-pixel pitch along the first axis and a second sub-pixel dimension along the second axis. The second sub-pixel dimension is substantially equal to a first value or a second value, the second value being greater than the first value. The first lines extend across the display at a first angle relative to the first axis.

20 Claims, 9 Drawing Sheets

(56) References Cited

U.S. PATENT DOCUMENTS

| | | | |
|---|---|---|---|
| 8,698,767 B2 | 4/2014 | Kwak | |
| 8,711,292 B2 | 4/2014 | Guard | |
| 8,723,824 B2 | 5/2014 | Myers | |
| 8,736,571 B1 | 5/2014 | Guard | |
| 8,797,285 B2 | 8/2014 | Guard | |
| 2001/0035924 A1 | 11/2001 | Fujieda | |
| 2005/0259082 A1* | 11/2005 | Potsch | 345/173 |
| 2007/0030222 A1* | 2/2007 | Lee et al. | 345/87 |
| 2008/0036853 A1 | 2/2008 | Shestak | |
| 2008/0239356 A1 | 10/2008 | Nakano | |
| 2008/0309635 A1 | 12/2008 | Matsuo | |
| 2009/0218310 A1 | 9/2009 | Zhu | |
| 2009/0273577 A1* | 11/2009 | Chen et al. | 345/174 |
| 2009/0315854 A1 | 12/2009 | Matsuo | |
| 2010/0079384 A1* | 4/2010 | Grivna | 345/173 |
| 2010/0149117 A1* | 6/2010 | Chien et al. | 345/173 |
| 2010/0156769 A1* | 6/2010 | Chang | 345/87 |
| 2010/0194697 A1* | 8/2010 | Hotelling et al. | 345/173 |
| 2010/0302201 A1 | 12/2010 | Ritter | |
| 2011/0148781 A1 | 6/2011 | Chen et al. | |
| 2011/0157102 A1 | 6/2011 | Ando | |
| 2011/0242028 A1 | 10/2011 | Lee | |
| 2011/0291966 A1* | 12/2011 | Takao et al. | 345/173 |
| 2012/0013546 A1 | 1/2012 | Westhues | |
| 2012/0031746 A1 | 2/2012 | Hwang | |
| 2012/0044165 A1 | 2/2012 | Kwak et al. | |
| 2012/0242588 A1 | 9/2012 | Myers | |
| 2012/0242592 A1 | 9/2012 | Rothkopf | |
| 2012/0242606 A1* | 9/2012 | Mackey | 345/173 |
| 2012/0243151 A1 | 9/2012 | Lynch | |
| 2012/0243719 A1 | 9/2012 | Franklin | |
| 2012/0262382 A1 | 10/2012 | Guard | |
| 2012/0262412 A1* | 10/2012 | Guard et al. | 345/174 |
| 2012/0313880 A1 | 12/2012 | Geaghan | |
| 2013/0076612 A1 | 3/2013 | Myers | |
| 2013/0100054 A1 | 4/2013 | Philipp | |
| 2013/0127739 A1 | 5/2013 | Guard | |
| 2013/0127769 A1 | 5/2013 | Guard | |
| 2013/0127771 A1 | 5/2013 | Guard | |
| 2013/0127772 A1 | 5/2013 | Guard | |
| 2013/0127775 A1 | 5/2013 | Yilmaz | |
| 2013/0127776 A1 | 5/2013 | Guard | |
| 2013/0155000 A1 | 6/2013 | Trend et al. | |
| 2013/0234974 A1 | 9/2013 | Guard | |
| 2013/0294037 A1* | 11/2013 | Kuriki et al. | 361/748 |
| 2013/0341070 A1 | 12/2013 | Kim | |
| 2013/0342472 A1 | 12/2013 | Guard | |
| 2014/0152580 A1 | 6/2014 | Weaver | |
| 2014/0152613 A1 | 6/2014 | Ishizaki | |
| 2014/0184936 A1 | 7/2014 | Oh | |
| 2014/0225839 A1* | 8/2014 | Dunphy et al. | 345/173 |

OTHER PUBLICATIONS

U.S. Appl. No. 14/159,981, filed Jan. 21, 2014, Guard.
U.S. Appl. No. 14/183,876, filed Feb. 19, 2014, Guard.
U.S. Appl. No. 14/183,918, Feb. 19, 2014, Guard.
Response to Non-Final Office Action for U.S. Appl. No. 13/910,055, Dec. 10, 2013.
Notice of Allowance for U.S. Appl. No. 13/910,055, Jan. 14, 2014.
U.S. Appl. No. 14/300,995, filed Jun. 10, 2014, Guard.
Non-Final Office Action for U.S. Appl. No. 14/159,981, May 16, 2014.
Notice of Allowance for U.S. Appl. No. 14/159,981, Jul. 28, 2014.
U.S. Appl. No. 14/248,096, filed Apr. 1, 2014, Guard.
U.S. Appl. No. 14/248,117, filed Apr. 8, 2014, Guard.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
U.S. Appl. No. 13/910,055 (Guard), Jun. 4, 2013.
Non-Final Office Action for U.S. Appl. No. 13/910,055, Sep. 10, 2013.
U.S. Appl. No. 14/469,918, filed Aug. 27, 2014, Guard.
U.S. Appl. No. 14/575,114, filed Oct. 27, 2014, Guard.
Response to Non-Final Office Action for U.S. Appl. No. 14/159,981, Jun. 19, 2014.
Notice of Allowance for U.S. Appl. No. 14/183,876, Oct. 14, 2014.
Notice of Allowance for U.S. Appl. No. 14/183,918, Oct. 8, 2014.
Response to Non-Final Office Action for U.S. Appl. No. 14/300,995, Oct. 24, 2014.
Notice of Allowance for U.S. Appl. No. 14/300,995, Nov. 13, 2014.
Non-Final Office Action for U.S. Appl. No. 14/469,918, Dec. 31, 2014.
Response to Non-Final Office Action for U.S. Appl. No. 14/469,918, Mar. 5, 2015.
Final Office Action for U.S. Appl. No. 14/469,918, Mar. 18, 2015.
Response to Final Office Action for U.S. Appl. No. 14/469,918, Apr. 28, 2015.
Response to Final Office Action for U.S. Appl. No. 14/469,918, Jun. 18, 2015.
Non-Final Office Action for U.S. Appl. No. 14/469,918, Jul. 27, 2015.

* cited by examiner

MESH DESIGN FOR TOUCH SENSORS

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
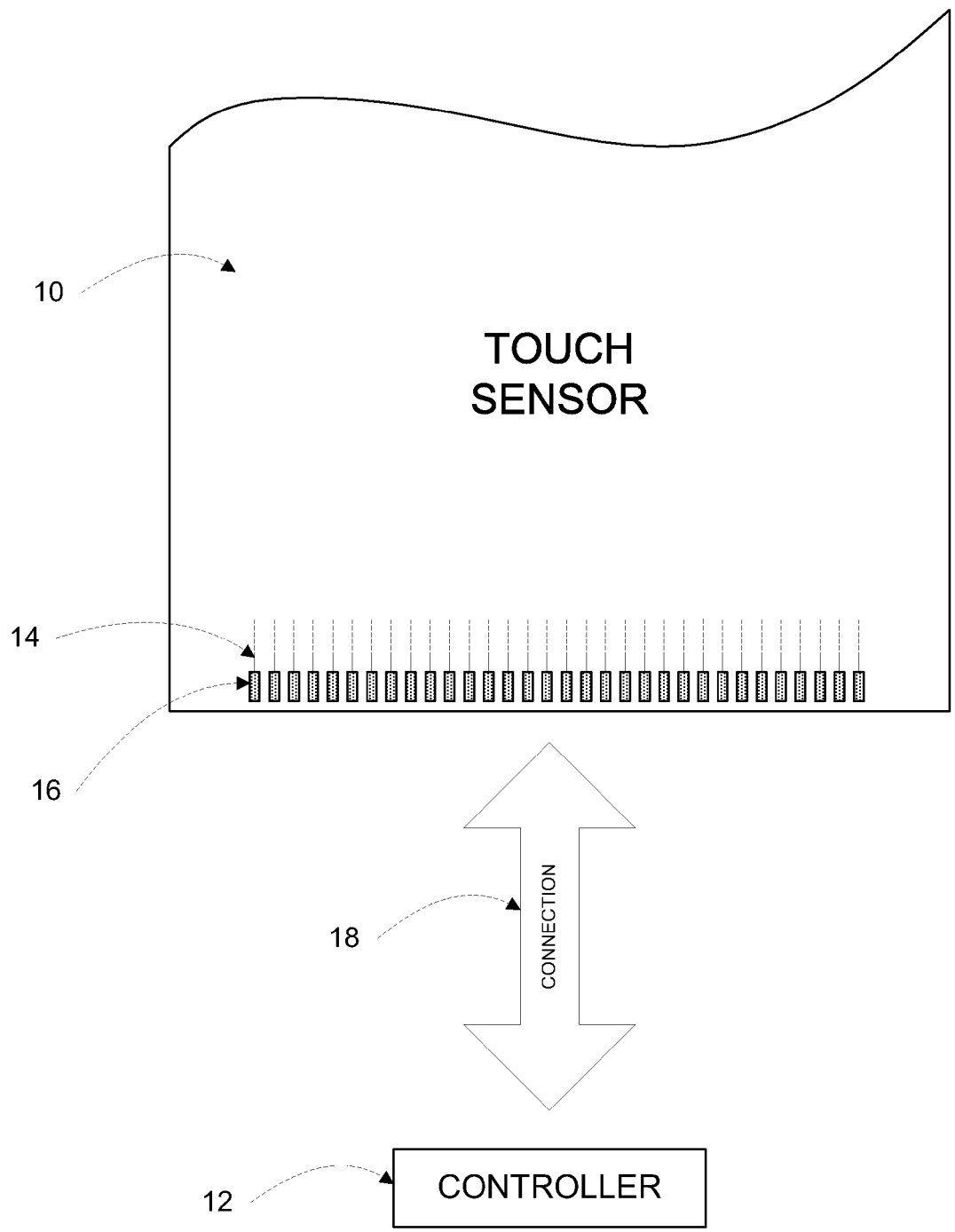
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
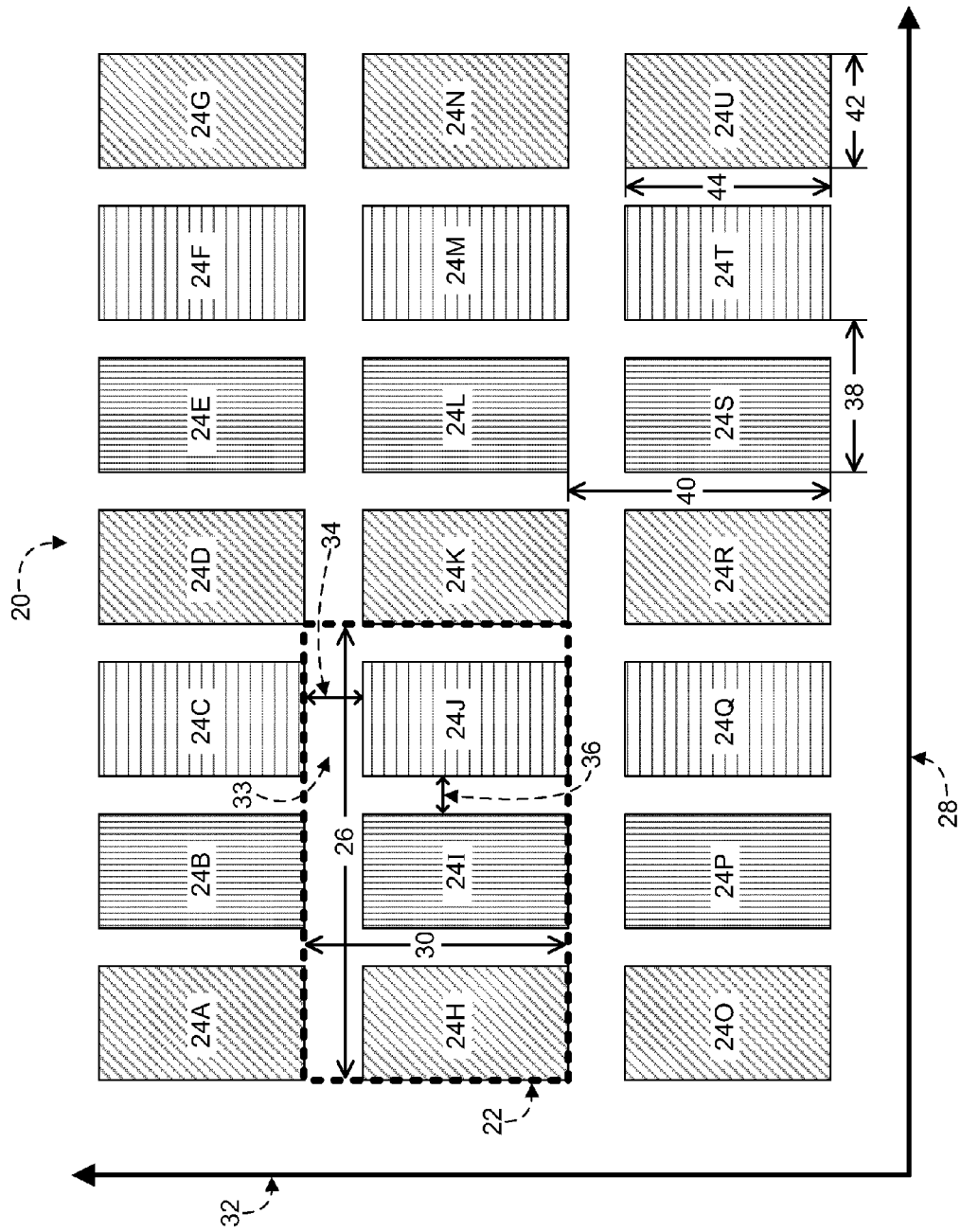
FIG. 2 illustrates an example portion of an example display including example pixels.

FIG. 2 illustrates an example portion 20 of an example display. A touch sensor may be overlaid on the display to implement a touch-sensitive display device, as described below. As an example and not by way of limitation, the display underneath the touch sensor may be a liquid crystal display (LCD), a light-emitting diode (LED) display, an LED backlight LCD, an electrophoretic display, a plasma display, or other suitable display. Although this disclosure describes and illustrates a particular display and particular display types, this disclosure contemplates any suitable device display and any suitable display types.

Portion 20 includes an array of pixels 22. In the example of FIG. 2, each pixel 22 includes three sub-pixels 24. In particular embodiments, each sub-pixel 24 may correspond to a particular color, such as for example red, green, or blue. The area of a pixel 22 (which may include dead space as discussed below) is indicated by the dashed-line border that encompasses sub-pixels 24H, 24I, and 24J in FIG. 2, where each sub-pixel may correspond to the color red, green, or blue, respectively. The combined output of sub-pixels 24 determines the color and intensity of each pixel 22. Although this disclosure describes and illustrates example pixels 22 with a particular number of sub-pixels 24 having particular colors, this disclosure contemplates any suitable pixels with any suitable number of sub-pixels having any suitable colors.

Sub-pixels 24 may be arranged in a repeating pattern along a horizontal axis 28 and a vertical axis 32 that are perpendicular to each other. Although this disclosure describes and illustrates horizontal and vertical axes 28 and 32, this disclosure contemplates any suitable axes having any suitable orientation. Each pixel 22 has a horizontal pixel pitch (HPP) 26, which in particular embodiments may be defined as the distance between corresponding features of two adjacent pixels 22 along horizontal axis 28 (such as the distance from the left edge of sub-pixel 24H to the left edge of sub-pixel 24K). Each pixel 22 also has a vertical pixel pitch (VPP) 30, which in particular embodiments may be defined as the distance between corresponding features of two adjacent pixels along vertical axis 32 (such as the distance from the lower edge of sub-pixel 24I to the lower edge of sub-pixel 24B). This disclosure contemplates any suitable pixels with any suitable HPPs and VPPs having any suitable values.

Each pixel 22 may also include dead space 33, which corresponds to regions of pixel 22 not occupied by a sub-pixel 24. In particular embodiments, dead space 33 has a height (DSH) 34 that may be defined as the distance between adjacent sub-pixels 24 along vertical axis 32 (such as the distance between sub-pixels 24C and 24J). In particular embodiments, dead space 33 has a width (DSW) 36 that may be defined as the distance between adjacent sub-pixels 24 along horizontal axis 28 (such as the distance between sub-pixels 24I and 24J). This disclosure contemplates any suitable pixels with any suitable dead space having any suitable dimensions.

Each sub-pixel 24 has a horizontal sub-pixel pitch (HSPP) 38, which may be defined in particular embodiments as the distance between corresponding features of two adjacent sub-pixels along horizontal axis 28, including width 36 of dead space 33 (such as the distance between the left edges of sub-pixels 24S and 24T). Each sub-pixel 24 also has a vertical sub-pixel pitch (VSPP) 40, which may be defined in particular embodiments as the distance between corresponding features of two adjacent sub-pixels along vertical axis 32, including height 34 of dead space 33 (such as the distance between the lower edges of sub-pixels 24S and 24L).

Each sub-pixel 24 has a sub-pixel width (SPW) 42, which may be defined in particular embodiments as the dimension of a sub-pixel along horizontal axis 28 (such as the distance between the left and right edges of sub-pixel 24U). Each sub-pixel 24 also has a sub-pixel height (SPH) 44, which may be defined in particular embodiments as the dimension of a sub-pixel along vertical axis 32 (such as the distance between the lower and upper edges of sub-pixel 24U). This disclosure contemplates any suitable sub-pixels with any suitable HSPPs, VSPPs, SPWs, and SPHs having any suitable values.

Pixel 22 and sub-pixel 24 may have a substantially rectangular shape, as illustrated in FIG. 2. Pixel 22 and sub-pixel 24 may have other suitable shapes, including but not limited to square, round, oval, or chevron-shaped. In the example of FIG. 2, vertical sub-pixel pitch 40 is equal to VPP 30, and VPP 30 is equal to the sum of SPH 44 and dead space height 34. Further, HPP 26 is equal to three times HSPP 38, and HSPP 38 is equal to the sum of sub-pixel width 42 and dead space width 36. Although this disclosure describes and illustrates example pixels 22 and example sub-pixels 24 having particular shapes, arrangements, and dimensions, this disclosure contemplates any suitable arrangement of any suitable pixels and sub-pixels having any suitable shapes and dimensions.

Figure 3:
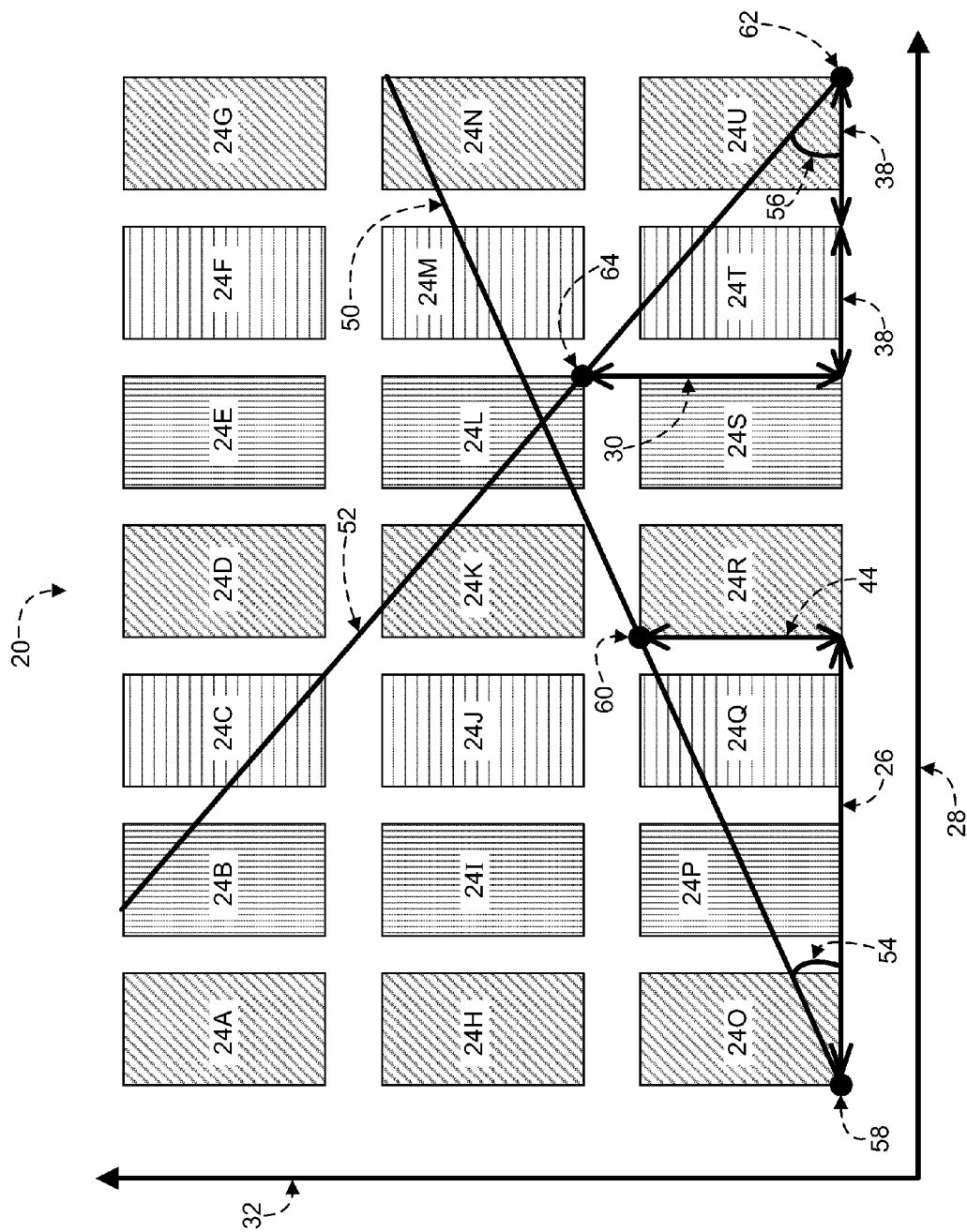
FIG. 3 illustrates example lines of an example mesh design.

FIG. 3 illustrates portion 20 of the example display of FIG. 2, with example conductive lines 50 and 52 overlying portion 20. Conductive lines 50 and 52 may be FLM and may make up part of a mesh pattern of an electrode of a touch sensor. In particular embodiments, an arrangement of conductive lines may be referred to as a mesh pattern or a mesh design. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate.

In the example of FIG. 3, conductive line 50 is oriented at an angle 54 relative to horizontal axis 28, and conductive line 52 is oriented at an angle 56 relative to horizontal axis 28. Angle 54 of conductive line 50 can be illustrated by drawing a line that passes through points 58 and 60, where point 58 is located at the lower left corner of sub-pixel 24O and point 60 is located at the upper left corner of sub-pixel 24R. The slope of conductive line 50 may be defined as the vertical rise of conductive line 50 divided by the horizontal run of conductive line 50, and angle 54 can be found from the arctangent of the slope. In the example of FIG. 3, the vertical rise of conductive line 50 is SPH 44, and the horizontal run of conductive line 50 is HPP 26. Thus, the slope of conductive line 50 equals SPH/HPP, and angle 54 ($\Theta_1$) can be found from the expression $\Theta_1 = \arctan(SPH/HPP)$. In the example of FIG. 3, angle 56 of conductive line 52 can be illustrated by drawing a line that passes through points 62 and 64, where point 62 is located at the lower right corner of sub-pixel 24U and point 64 is located at the lower right corner of sub-pixel 24L. The slope of conductive line 52 may be defined as the vertical rise of conductive line 52 divided by the horizontal run of conductive line 52, and angle 56 can be found from the arctangent of the slope. In the example of FIG. 3, the vertical rise of conductive line 52 is VPP 30, and the horizontal run of conductive line 52 is two times HSPP 38. Thus, the slope of conductive line 52 equals VPP/2·HSPP, and angle 56 ($\Theta_2$) can be found from the expression $\Theta_2 = \arctan(VPP/2 \cdot HSPP)$. In particular embodiments, conductive lines 50 and 52 may make up part of a mesh pattern of a touch sensor and angles $\Theta_1$ and $\Theta_2$ may vary by up to approximately 1° from the values calculated in the expressions above without substantially degrading the optical performance of the mesh pattern. Angles $\Theta$ of conductive lines 50 and 52 in FIGS. 4A-4B and 5-8 (which are described below) may similarly vary.

In the example of FIG. 3, conductive line 50 is oriented counterclockwise at angle 54 relative to horizontal axis 28, and conductive line 52 is oriented clockwise at angle 56 relative to horizontal axis 28. In particular embodiments, conductive line 50 may be oriented clockwise at angle 54 relative to horizontal axis 28, and conductive line 52 may be oriented counterclockwise at angle 56 relative to horizontal axis 28. In particular embodiments, conductive line 50 may be oriented clockwise or counterclockwise at angle 54 relative to horizontal axis 28, and conductive line 52 may be oriented clockwise or counterclockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis. As described above, angles 54 and 56 may vary by up to approximately 1° from the values calculated in the expressions above without substantially degrading the optical performance of the mesh pattern. Such rotation of up to approximately 1° may occur during a manufacturing process, for example. Similarly, a mesh pattern made up of conductive lines 50 and 52 in any of FIGS. 4A-4B and 5-8 (described below) may have conductive lines 50 and 52 with any suitable clockwise or counterclockwise rotational orientation and a variation of angles 54 and 56 of up to approximately 1°. In particular embodiments, a mesh pattern may have any suitable alignment relative to pixels 22 and sub-pixels 24 (which may differ from the alignment illustrated in FIG. 3). For example, the mesh pattern may be displaced horizontally, vertically, or both relative to pixels 22 and sub-pixels 24 (as may occur during a manufacturing process) without substantially degrading the optical performance of the mesh pattern. In particular embodiments, conductive line 50 need not be constrained to pass through points 58 and 60 but may be displaced along horizontal axis 28 and vertical axis 32 by any suitable amount. Similarly, in particular embodiments, conductive line 52 need not be constrained to pass through points 62 and 64 but may also be displaced along horizontal axis 28 and vertical axis 32 by any suitable amount. A mesh pattern made up of conductive lines 50 and 52 in any of FIGS. 4A-4B and 5-8 (which are described below) may similarly have any suitable alignment or displacement.

Although this disclosure describes and illustrates a touch sensor with only a single layer of conductive lines 50 and 52, this disclosure contemplates a touch sensor with any suitable number of layers of conductive lines 50 and 52. As an example, the touch sensor may have a first layer of conductive lines 50 and 52 disposed on one side of a single substrate and a second layer of conductive lines 50 and 52 disposed on another side of the substrate. As another example, the touch sensor may have a first layer of conductive lines 50 and 52 disposed on one side of one substrate and a second layer of conductive lines 50 and 52 disposed on one side of another substrate. In such dual-layer (or multi-layer) touch-sensor configurations, one of the layers of conductive lines 50 and 52 may provide drive electrodes of the touch sensor and the other layer of conductive lines 50 and 52 may provide sense electrodes of the touch sensor. Moreover, in such dual-layer touch-sensor configurations, first layer of conductive lines 50 and 52 and second layer of conductive lines 50 and 52 may be offset from each other by a specific distance along a specific direction. In particular embodiments, adjacent conductive lines 50 of the first layer may have a separation distance along horizontal axis 28 that is substantially the same as a separation distance along horizontal axis 28 of adjacent conductive lines 50 of the second layer. Similarly, in particular embodiments, adjacent conductive lines 52 of the first layer may have a separation distance along horizontal axis 28 that is substantially the same as a separation distance along horizontal axis 28 of adjacent conductive lines 52 of the second layer. In particular embodiments, a first layer of conductive lines 50 may be offset from a second layer of conductive lines 50 along horizontal axis 28 by a distance that is substantially equal to one-half the distance between conductive lines 50 of the first layer as measured along horizontal axis 28. Similarly, in particular embodiments, a first layer of conductive lines 52 may be offset from a second layer of conductive lines 52 along horizontal axis 28 by a distance that is substantially equal to one-half the distance between conductive lines 52 of the first layer as measured along horizontal axis 28. For example, in particular embodiments, adjacent conductive lines 50 of the first layer may be separated from each other along horizontal axis 28 by a distance that is substantially equal to six times HPP 26 (or 18 times HSPP 38), and adjacent conductive lines 50 of the second layer may have approximately the same spacing. For example, in particular embodiments, a first layer of conductive lines 50 may be offset from a second layer of conductive lines 50 by a distance along horizontal axis 28 that is substantially equal to three times HPP 26 (or nine times HSPP 38). For example, in particular embodiments, adjacent conductive lines 52 of the first layer may have a separation distance along horizontal axis 28 that is substantially equal to 13/3 times HPP 26 (or 13 times HSPP 38), and adjacent conductive lines 52 of the second layer may have approximately the same spacing. For example, in particular embodiments, a first layer of conductive lines 52 may be offset from a second layer of conductive lines 52 by a distance along horizontal axis 28 that is substantially equal to 13/6 times HPP 26 (or 6.5 times HSPP 38). This disclosure similarly contemplates a touch sensor with any suitable number of layers of conductive lines 50 and 52 in the mesh design of any of FIGS. 4A-4B and 5-8 (which are described below). Although this disclosure describes multi-layer touch sensors with particular offsets between conductive lines of different layers, this disclosure contemplates multi-layer touch sensors with any suitable offsets between conductive lines of different layers.

Figure 4A:
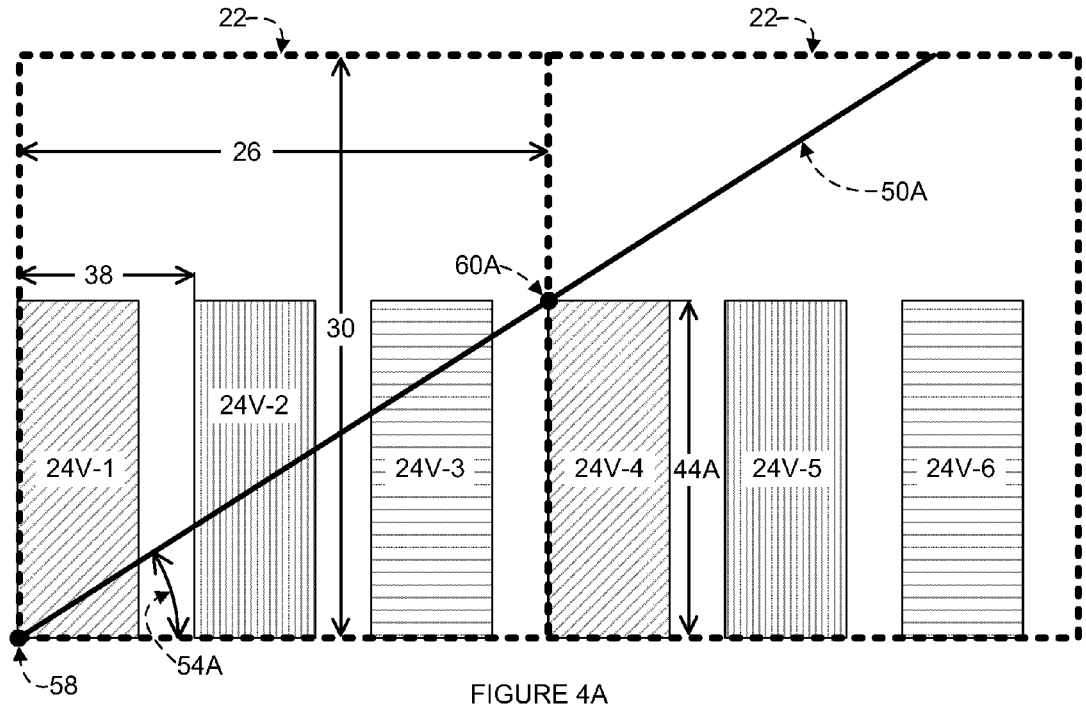
FIGS. 4A-4B illustrate example pixels with example sub-pixels and example lines of an example mesh design.
Figure 4B:
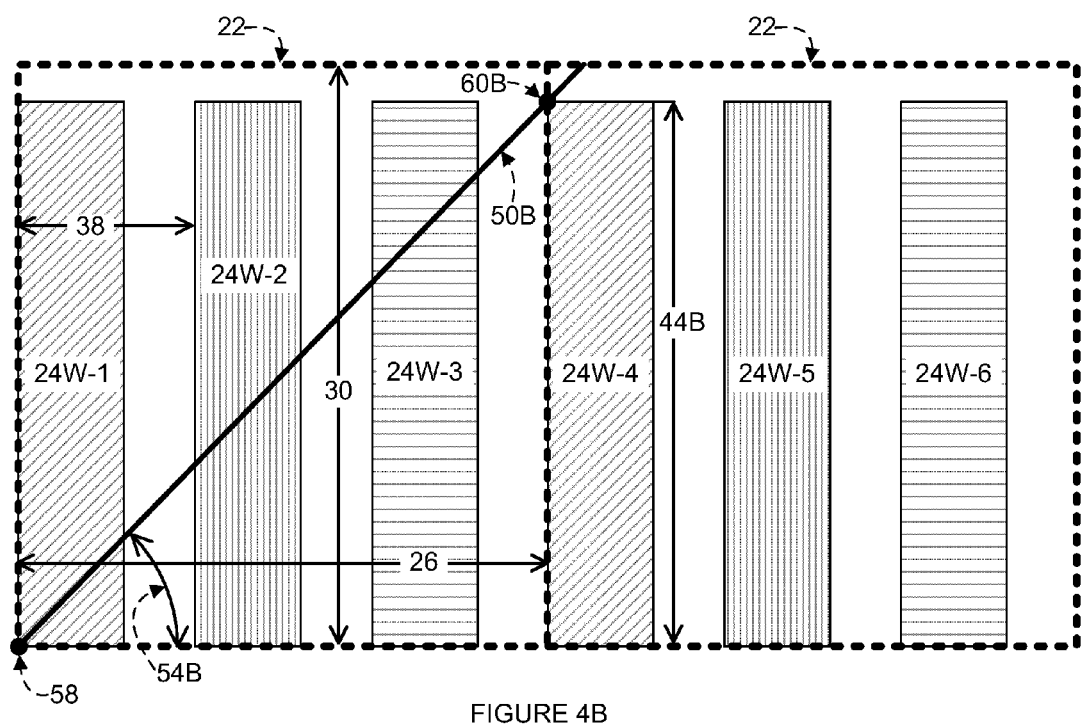

FIGS. 4A-4B illustrate example pixels 22 with example sub-pixels 24 and example conductive lines 50 of an example mesh design. In FIGS. 4A-4B, example conductive lines 50A and 50B may be FLM and may make up part of a mesh pattern of an electrode of a touch sensor. FIG. 4A illustrates two adjacent pixels 22 which may be a display portion, similar to portion 20, and FIG. 4B illustrates two adjacent pixels 22 which may be another display portion, similar to portion 20. Each pixel 22 in FIG. 4A and FIG. 4B may have substantially the same HPP 26 and VPP 30. Sub-pixels 24V in FIG. 4A and sub-pixels 24W in FIG. 4B may have different dimensions. In particular embodiments, sub-pixels 24V and 24W may have different heights (SPH 44). In particular embodiments, sub-pixel 24V may represent a shorter sub-pixel, and sub-pixel 24W may represent a taller sub-pixel. Sub-pixels 24V in FIG. 4A may have height 44A, and sub-pixels 24W in FIG. 4B may have height 44B. In particular embodiments, sub-pixel height 44 may be referred to as a value or a dimension. As illustrated in FIGS. 4A-4B, sub-pixels 24W may be taller than sub-pixels 24V, and height 44B may be correspondingly greater than height 44A. In particular embodiments, sub-pixels 24V and 24W may have approximately the same sub-pixel width (SPW 42), or sub-pixels 24V and 24W may have different SPWs 42. In particular embodiments, HSPP 38 in FIGS. 4A and 4B may be approximately the same. Although this disclosure describes and illustrates particular sub-pixels 24 having particular widths and heights, this disclosure contemplates any suitable sub-pixels 24 having any suitable widths and heights.

In the example of FIG. 4A, angle 54A of conductive line 50A can be illustrated by a line that passes through points 58 and 60A, where point 58 is located at the lower left corner of sub-pixel 24V-1 and point 60A is located at the upper left corner of sub-pixel 24V-4. Similarly, in the example of FIG. 4B, angle 54B of conductive line 50B can be illustrated by a line that passes through points 58 and 60B, where point 58 is located at the lower left corner of sub-pixel 24W-1 and point 60B is located at the upper left corner of sub-pixel 24W-4. In FIGS. 4A-4B, SPH 44B may be greater than SPH 44A, and angle 54B may be greater than angle 54A.

Figure 5:
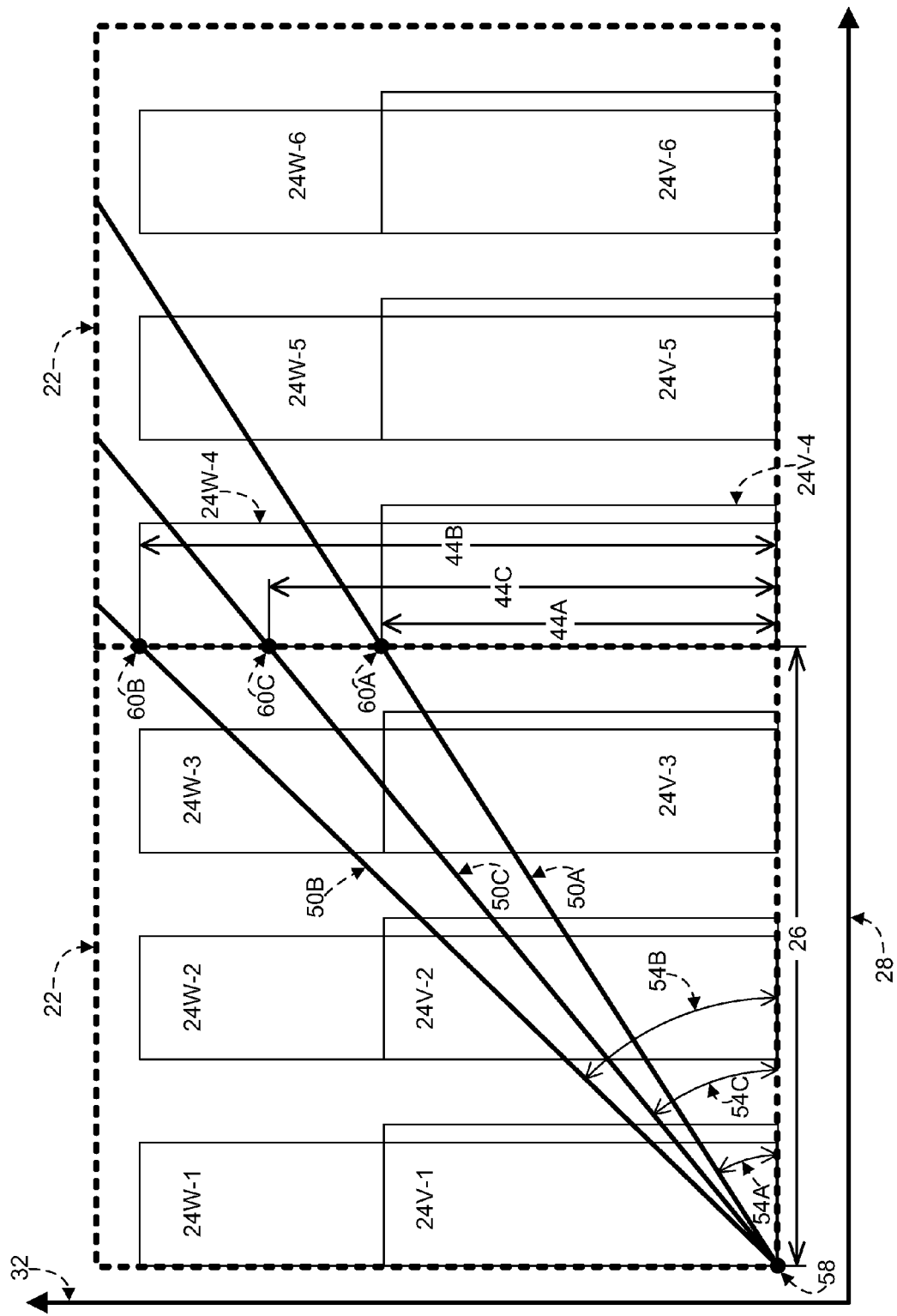
FIG. 5 illustrates the example pixels, example sub-pixels, and example lines of FIGS. 4A and 4B overlaid on one another.

FIG. 5 illustrates example pixels 22, example sub-pixels 24, and example conductive lines 50 of FIGS. 4A and 4B overlaid on one another. Sub-pixels 24V may represent one display, and sub-pixels 24W may represent a second display overlaid on the first display for the purposes of visualizing the two displays together. For clarity of visualizing the features of FIG. 5 (and FIGS. 6-8 below), sub-pixels 24 in FIGS. 5-8 are not shaded or hatched. In the example of FIG. 5, conductive line 50A is oriented at an angle 54A relative to horizontal axis 28, and, as described above, angle 54A of conductive line 50A can be illustrated by a line that passes through points 58 and 60A. The slope of conductive line 50A may be defined as the vertical rise of conductive line 50A divided by the horizontal run of conductive line 50A, and angle 54A can be found from the arctangent of the slope. In the example of FIG. 5, the vertical rise of conductive line 50A is $SPH_A$ 44A (sub-pixel height of sub-pixel 24V), and the horizontal run of conductive line 50A is HPP 26. Thus, the slope of conductive line 50A equals $SPH_A$/HPP, and angle 54A ($\Theta_A$) can be found from the expression $\Theta_A = \arctan(SPH_A/HPP)$. In the example of FIG. 5, conductive line 50B is oriented at an angle 54B relative to horizontal axis 28, and, as described above, angle 54B of conductive line 50B can be illustrated by a line that passes through points 58 and 60B. The slope of conductive line 50B may be defined as the vertical rise of conductive line 50B divided by the horizontal run of conductive line 50B, and angle 54B can be found from the arctangent of the slope. In the example of FIG. 5, the vertical rise of conductive line 50B is $SPH_B$ 44B (sub-pixel height of sub-pixel 24W), and the horizontal run of conductive line 50B is HPP 26. Thus, the slope of conductive line 50A equals $SPH_B$/HPP, and angle 54B ($\Theta_B$) can be found from the expression $\Theta_B = \arctan(SPH_B/HPP)$. As illustrated in FIG. 5, $SPH_B$ 44B is greater than $SPH_A$ 44A, and angle 54B ($\Theta_B$) is greater than angle 54A ($\Theta_A$).

In the example of FIG. 5, conductive line 50C is oriented at an angle 54C relative to horizontal axis 28, and angle 54C of conductive line 50C can be illustrated by a line that passes through points 58 and 60C. In FIG. 5, point 60C is located along a border between the two pixels 22, and point 60C is located at or between points 60A and 60C. In FIG. 5, point 60C is located at height 44C above a lower edge of pixels 22. In particular embodiments, height 44C may be denoted as $H_C$, and height 44C may be greater than or equal to $SPH_A$ 44A and less than or equal to $SPH_B$ 44B. In particular embodiments, the relationship between $SPH_A$ 44A, $SPH_B$ 44B, and $H_C$ 44C may be expressed as $SPH_A \leq H_C \leq SPH_B$.

In the example of FIG. 5, the slope of conductive line 50C may be defined as the vertical rise of conductive line 50C divided by the horizontal run of conductive line 50C, and angle 54C can be found from the arctangent of the slope. In the example of FIG. 5, the vertical rise of conductive line 50C is height 44C, and the horizontal run of conductive line 50C is HPP 26. Thus, the slope of conductive line 50C equals $H_C$/HPP, and angle 54C ($\Theta_C$) can be found from the expression $\Theta_C$=arctan($H_C$/HPP). In particular embodiments, angle 54C ($\Theta_C$) may be greater than or equal to angle 54A ($\Theta_A$) and less than or equal to angle 54B ($\Theta_B$). In particular embodiments, the relationship between angles 54A ($\Theta_A$), 54B ($\Theta_B$), and 54C ($\Theta_C$) may be expressed as $\Theta_A \leq \Theta_C \leq \Theta_B$. In particular embodiments, angle 54C may be any suitable angle between or equal to angles 54A and angles 54B. In particular embodiments, height 44C may approximately equal an average of $SPH_A$ 44A and $SPH_B$ 44B, and angle 54C ($\Theta_C$) may be found from the expression $\Theta_C$=arctan [($SPH_A$+$SPH_B$)/(2×HPP)]. In particular embodiments, angle 54C ($\Theta_C$) may approximately equal an average of angles 54A ($\Theta_A$) and 54B ($\Theta_B$), and angle 54C ($\Theta_C$) may be found from the expression $$\Theta_C \cong \frac{1}{2} \times \left[ \arctan\left(\frac{SPH_A}{HPP}\right) + \arctan\left(\frac{SPH_B}{HPP}\right) \right].$$

Although this disclosure describes and illustrates particular conductive lines 50 having particular angles 54, this disclosure contemplates any suitable conductive lines 50 having any suitable angles 54.

In the example of FIG. 5, sub-pixels 24V may represent sub-pixels of one display, and sub-pixels 24W may represent sub-pixels of another display. In particular embodiments, a display that includes sub-pixels 24V may have substantially the same pixel pitches (HPP 26 and VPP 30) as a display that includes sub-pixels 24W. In particular embodiments, a display that includes sub-pixels 24V may have substantially the same HPP 26 as a display that includes sub-pixels 24W, and the two displays may have different VPPs 30. In particular embodiments, a mesh pattern that includes one or more conductive lines 50C having an angle 54C as described above may make up part of an electrode of a touch sensor that may be used with two or more displays. In particular embodiments, a mesh pattern including one or more conductive lines 50C with an angle 54C as described above may make up part of an electrode of a touch sensor that may be used with one display that includes sub-pixels 24V and another display that includes sub-pixels 24W.

In particular embodiments, a conductive line 50 having an angle 54 may be defined for the case of three or more displays, where each display may have substantially the same HPP 26, and sub-pixels 24 of one or more of the displays may have different heights (SPHs 44). In particular embodiments, a mesh pattern that includes conductive lines 50 having an angle 54 may make up part of an electrode of a touch sensor that may be used with three or more a displays. As an example and not by way of limitation, a mesh pattern that includes conductive lines 50 having an angle 54 ($\Theta_D$) may be used with N displays, where N is an integer greater than or equal to 2, and the N displays have sub-pixels 24 with minimum height $SPH_1$ and maximum height $SPH_N$. In such an example, angle 54 ($\Theta_D$) can be found from the expression $\Theta_D$=arctan($H_D$/HPP), where $SPH_1 \leq H_D \leq SPH_N$. As an example and not by way of limitation, a mesh pattern that includes conductive lines 50 having an angle 54 ($\Theta_4$) may be used with three displays having sub-pixels 24 with heights $SPH_1$, $SPH_2$, and $SPH_3$, where $SPH_1 \leq SPH_2 \leq SPH_3$. In particular embodiments, angle 54 ($\Theta_4$) for a mesh pattern that may be used with three displays can be found from the expression $\Theta_4$=arctan($H_4$/HPP), where $H_4$ may be any value between or equal to $SPH_1$ and $SPH_3$ so that $SPH_1 \leq H_4 \leq SPH_3$. In particular embodiments, $H_4$ may be an average of $SPH_1$, $SPH_2$, and $SPH_3$, so that $H_4$=($SPH_1$+$SPH_2$+$SPH_3$)/3, and angle 54 ($\Theta_4$) can be found from the expression $\Theta_4$=arctan [($SPH_1$+$SPH_2$+$SPH_3$)/(3×HPP)].

Figure 6:
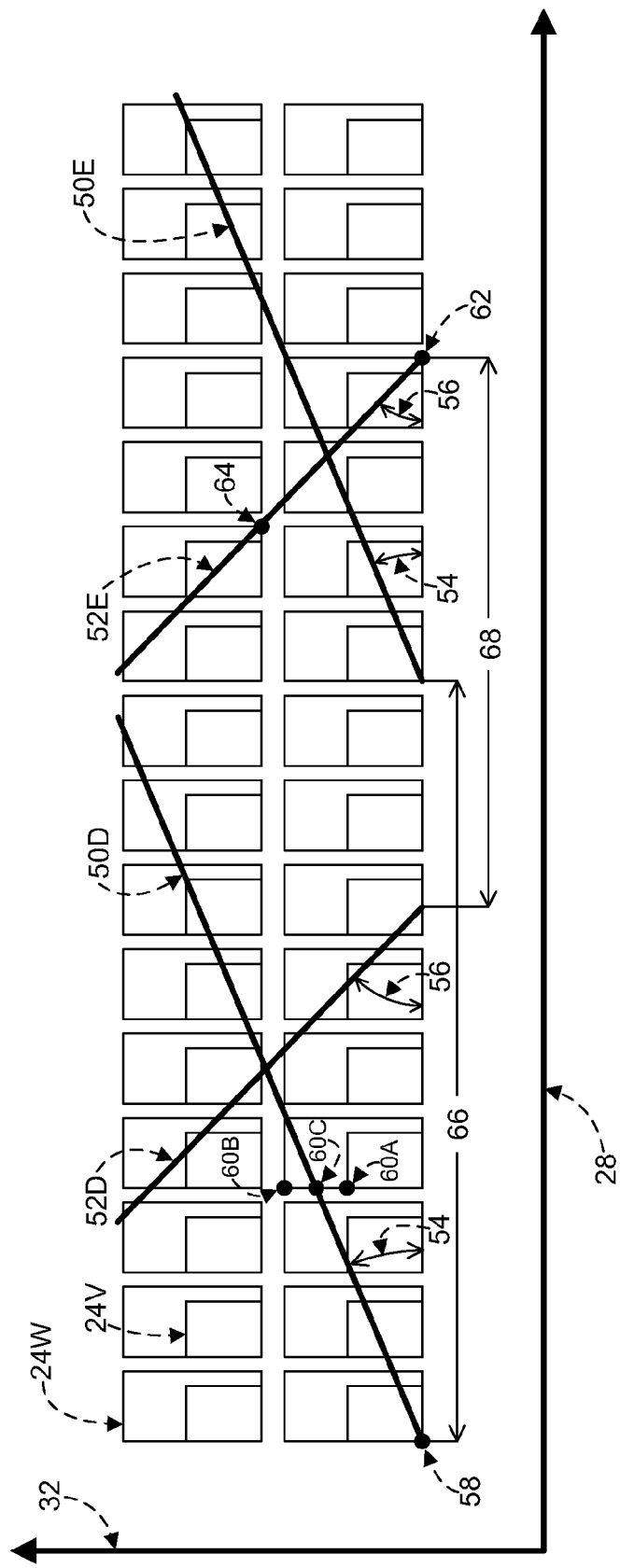
FIGS. 6-9 illustrate example mesh designs.
Figure 7:
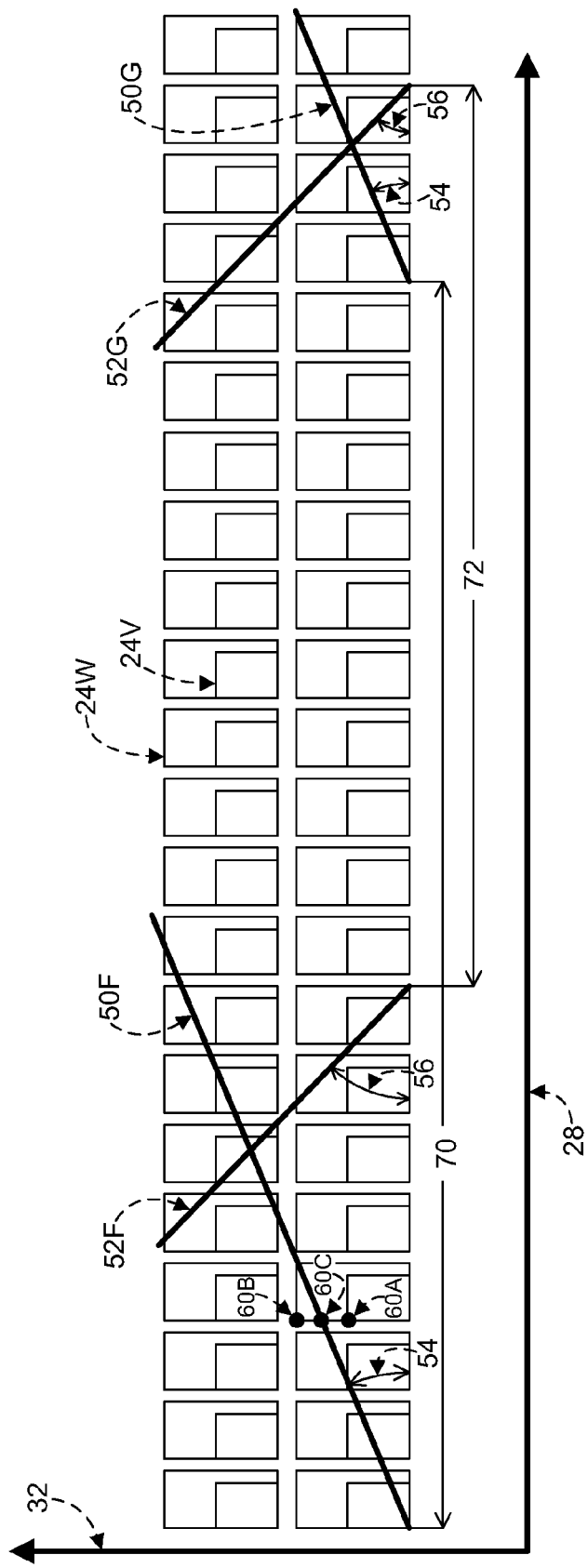
Figure 8:
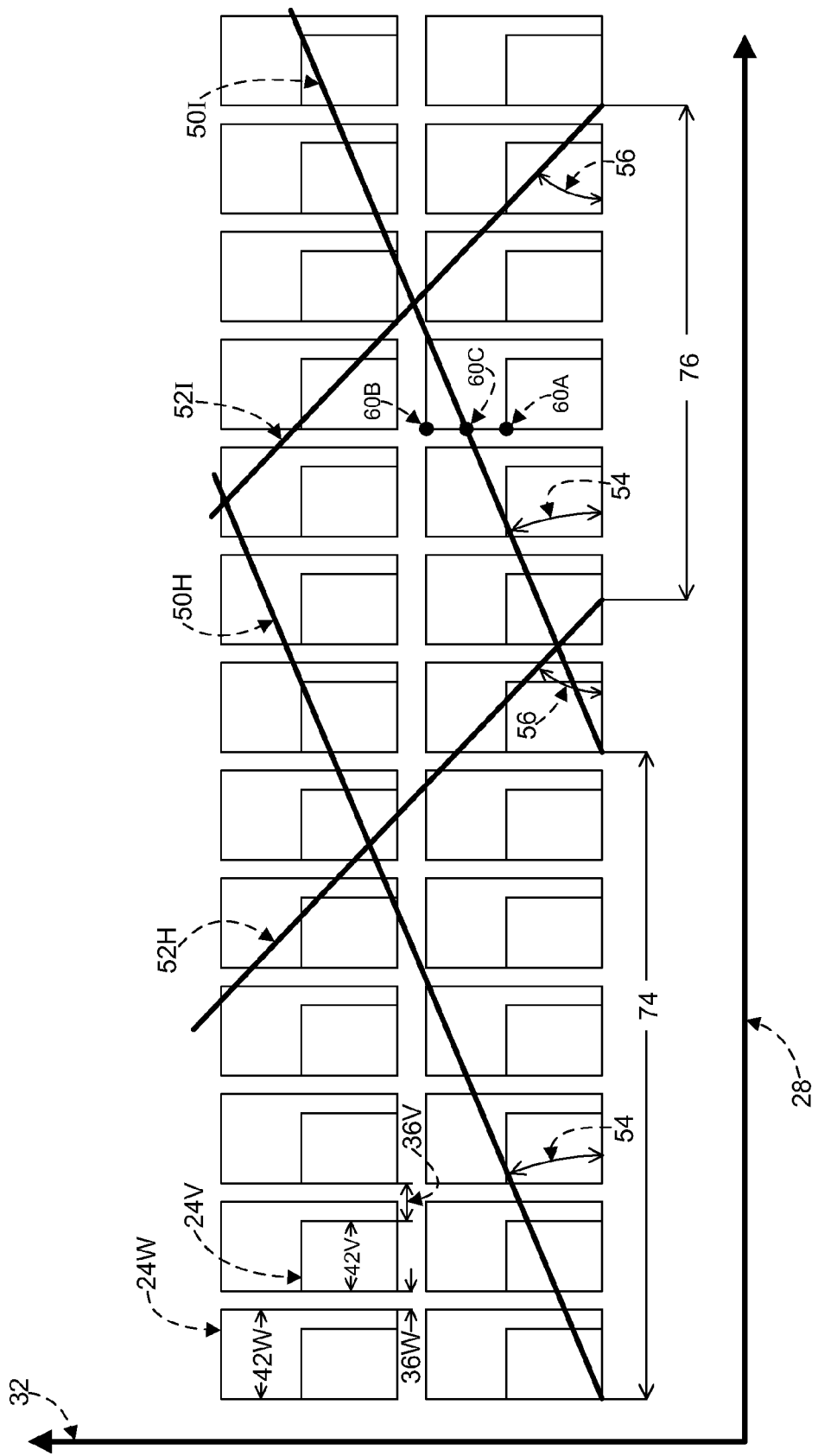

FIGS. 6-8 illustrate example mesh designs of conductive lines 50 and 52 overlaid on example display portions, similar to portion 20. As in FIGS. 3, 4A-4B, and 5, conductive lines 50 and 52 in the examples of FIGS. 6-8 may be FLM and may be part of a mesh pattern of a touch sensor. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate. Conductive lines 50 in each of FIGS. 6-8 are substantially parallel to each other, and each conductive line 50 forms an angle 54 relative to horizontal axis 28. Additionally, conductive lines 50 in each of FIGS. 6-8 are substantially evenly spaced from one another with adjacent conductive lines 50 having an equal separation distance. Conductive lines 52 in FIGS. 6-8 are also substantially parallel to each other, forming an angle 56 relative to horizontal axis 28. Conductive lines 52 are also substantially evenly spaced from one another with adjacent conductive lines 52 having an equal separation distance.

In FIGS. 6-8, two sets of sub-pixels with different SPHs 44 are shown, where sub-pixel 24V may represent a shorter sub-pixel having height $SPH_A$, and sub-pixel 24W may represent a taller sub-pixel having height $SPH_B$. In FIGS. 6-8, sub-pixels 24V may represent one display, and sub-pixels 24W may represent a second display overlaid on the first display for the purposes of visualizing the two displays together. In particular embodiments, sub-pixels 24V and 24W may have different widths (SPW 42), or sub-pixels 24V and 24W may have approximately the same SPW 42. In each example of FIGS. 6-8 conductive lines 50 and 52 may represent a mesh design of part of an electrode of a touch sensor that may be used with each of the two displays. In particular embodiments, other mesh designs may be described in a similar manner and may be used with three, four, or more displays. Although this disclosure describes and illustrates particular mesh designs for use with a particular number of displays, this disclosure contemplates any suitable mesh designs for use with any suitable number of displays.

In the examples of FIGS. 6-8, conductive lines 50 have angle 54 ($\Theta_C$) relative to horizontal axis 28, where angle 54 may be illustrated by a line passing through points 58 and 60C. As described above in the example of FIG. 5, angle 54 ($\Theta_C$) in FIGS. 6-8 can be found from the expression $\Theta_C$=arctan($H_C$/HPP), where $SPH_A \leq H_C \leq SPH_B$. In the examples of FIGS. 6-8, conductive lines 52 have angle 56 ($\Theta_2$) relative to horizontal axis 28, where angle 56 may be illustrated by a line passing through points 62 and 64. As described above, angle 56 ($\Theta_2$) can be found from the expression $\Theta_2$=arctan(VPP/2·HSPP). In particular embodiments, angle 56, which depends on the vertical pixel pitch (VPP) and the horizontal sub-pixel pitch (HSPP), may be independent of sub-pixel dimensions (SPW and SPH). In the examples of FIGS. 6-8, conductive lines 50 are oriented counterclockwise at angle 54 relative to horizontal axis 28, and conductive lines 52 are oriented clockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis.

In the example of FIG. 6, conductive lines 50D and 50E have a separation distance 66 along horizontal axis 28 that is substantially equal to three times HPP 26 (or nine times HSPP 38), and conductive lines 52D and 52E have a separation distance 68 along horizontal axis 28 that is substantially equal to 13/6 times HPP 26 (or 6.5 times HSPP 38). The mesh design of FIG. 6 may be preferable for a display with an HPP of approximately 150 lam. In the example mesh design of FIG. 7, conductive lines 50F and 50G have a separation distance 70 along horizontal axis 28 that is substantially equal to six times HPP 26 (or 18 times HSPP 38), and conductive lines 52F and 52G have a separation distance 72 along horizontal axis 28 that is substantially equal to 13/3 times HPP 26 (or 13 times HSPP 38). The mesh design of FIG. 7 may be preferable for a display with an HPP that is substantially less than 150 µm. In the example mesh design of FIG. 8, conductive lines 50H and 50I have a separation distance 74 along horizontal axis 28 that is substantially equal to two times HPP 26 (or six times HSPP 38), and conductive lines 52H and 52I have a separation distance 76 along horizontal axis 28 that is substantially equal to the sum of HPP 26, HSPP 38, dead space width 36, and ½ of sub-pixel width 42. In particular embodiments, sub-pixel 24V may have width $SPW_V$ 42V and corresponding dead space width $DSW_V$ 36V, and sub-pixel 24W may have width $SPW_W$ 42W and corresponding dead space width $DSW_W$ 36W. In particular embodiments, $SPW_{AVG}$ may be an average of $SPW_V$ 42V and $SPW_W$ 42W, so that $$SPW_{AVG} = \frac{SPW_V + SPW_W}{2}.$$

In particular embodiments, $DSW_{AVG}$ may be an average of $DSW_V$ 36V and $DSW_W$ 36W, so that $$DSW_{AVG} = \frac{DSW_V + DSW_W}{2}.$$

In particular embodiments, conductive lines 52H and 52I may have a separation distance 76 along horizontal axis 28 that is substantially equal to the sum of HPP 26, HSPP 38, $DSW_{AVG}$, and ½ of $SPW_{AVG}$. The mesh design of FIG. 8 may be preferable for a display with an HPP of approximately 250 µm. Although this disclosure describes and illustrates particular separation distances between conductive lines, this disclosure contemplates any suitable separation distances between any suitable conductive lines.

In particular embodiments, conductive lines 50 and 52 are substantially straight lines. In addition or as an alternative, in particular embodiments, non-linear conductive line patterns may be used to avoid long linear stretches of conductive metal with a repeat frequency, which may reduce the appearance of optical interference or moiré patterns. As an example and not by way of limitation, one or more segments of one or more conductive lines 50 and 52 may be substantially sinusoidal. In particular embodiments, conductive lines 50 and 52 may have a sinusoidal variation with a peak-to-peak amplitude between 0 and 30 µm. Additionally, in particular embodiments, conductive lines 50 may have a sinusoidal variation with a period approximately equal to the separation distance between conductive lines 52 as measured along conductive lines 50. Similarly, in particular embodiments, conductive lines 52 may have a sinusoidal variation with a period approximately equal to the separation distance between conductive lines 50 as measured along conductive lines 52. Although this disclosure describes and illustrates particular meshes that have particular conductive lines 50 and 52 with particular curves (e.g., substantially straight or substantially sinusoidal), this disclosure contemplates any suitable meshes that have any suitable conductive lines with any suitable curves.

Figure 9:
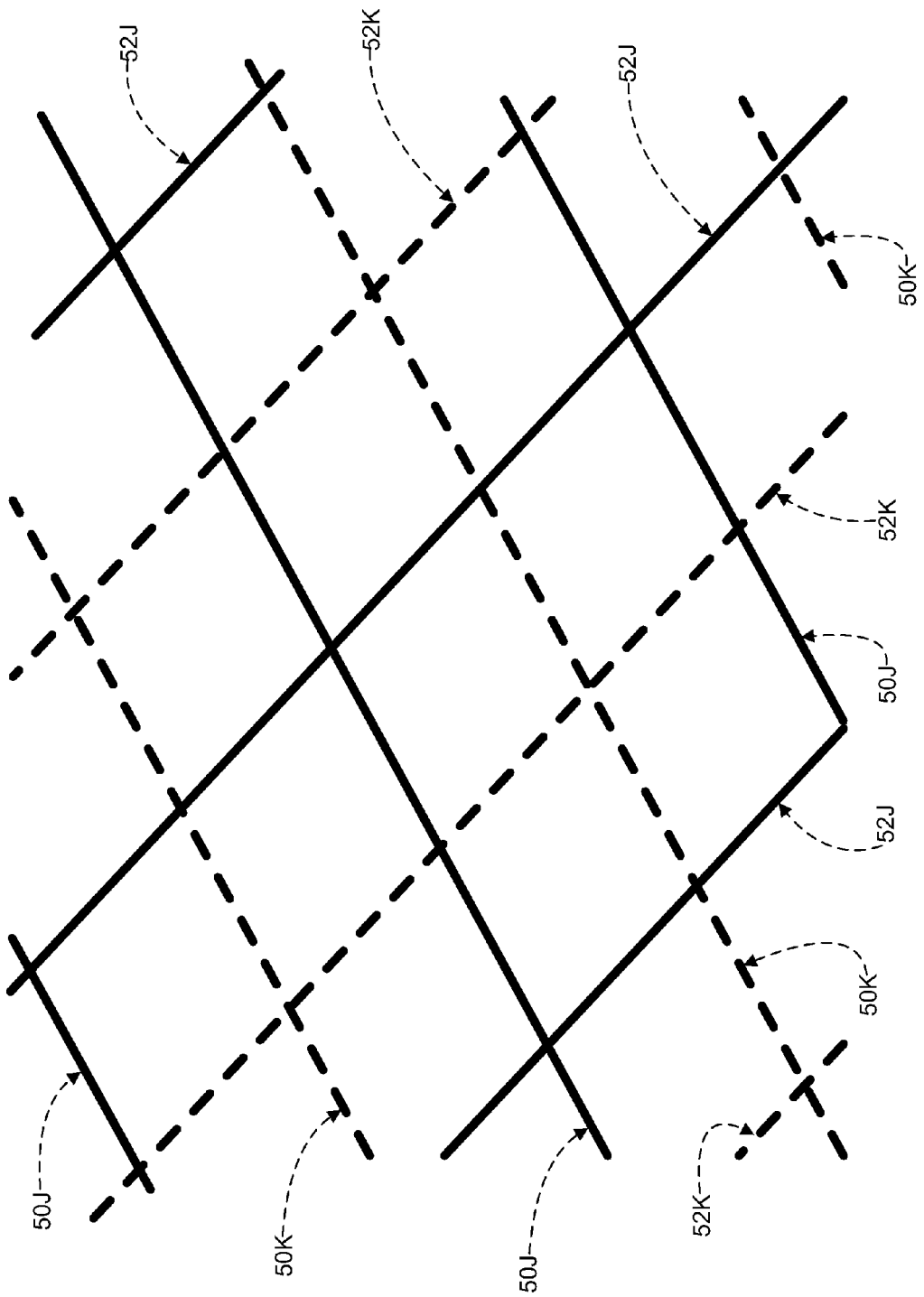

FIG. 9 illustrates an example mesh design similar to the example mesh designs of FIGS. 6-8. In particular embodiments, a mesh pattern may include two or more conductive lines 50 and 52. In particular embodiments, a mesh pattern may include on the order of 1, 10, 100, 1,000, or any suitable number of conductive lines 50 and 52. This disclosure contemplates any suitable mesh pattern that includes any suitable number of conductive lines. Example conductive lines 50 and 52 of FIG. 9 may overlie a display portion; for clarity of viewing conductive lines 50 and 52, pixels of a display portion are not shown in FIG. 9. In FIG. 9, angles of conductive lines 50 and 52 and separation distance between adjacent conductive lines 50 and 52 may be determined in a similar manner as described above for FIGS. 3, 4A-4B, and 5-8. As in FIGS. 3, 4A-4B, and 5-8, conductive lines 50 and 52 in FIG. 9 may be FLM and may be part of a mesh pattern of a touch sensor. Conductive lines 50 in FIG. 9 are substantially parallel to each other and are substantially evenly spaced from one another with adjacent conductive lines 50 having an approximately equal separation distance. Conductive lines 52 in FIG. 9 are also substantially parallel to each other and are also substantially evenly spaced from one another with adjacent conductive lines 52 having an approximately equal separation distance.

A mesh pattern represented by conductive lines 50 and 52 in the examples of FIGS. 6-9 may have a single-layer, dual-layer, or suitable multi-layer configuration. In particular embodiments, for a single-layer mesh pattern, conductive lines 50 and 52 in the examples of FIGS. 6-9 may be disposed on one side of a substrate. In particular embodiments, a dual-layer mesh pattern may have a first layer of conductive lines 50 and 52 disposed on one side of a single substrate and a second layer of conductive lines 50 and 52 disposed on another side of the substrate. As another example, a dual-layer mesh pattern may have a first layer of conductive lines 50 and 52 disposed on one side of one substrate and a second layer of conductive lines 50 and 52 disposed on one side of another substrate. As an example and not by way of limitation, the mesh pattern of example FIG. 6 may have a dual-layer configuration with conductive lines 50D and 52D included in a first layer and conductive lines 50E and 52E included in a second layer. Similarly, the mesh pattern of example FIG. 7 may have a dual-layer configuration with conductive lines 50F and 52F included in a first layer and conductive lines 50G and 52G included in a second layer. Similarly, the mesh pattern of example FIG. 8 may have a dual-layer configuration with conductive lines 50H and 52H included in a first layer and conductive lines 50I and 52I included in a second layer.

The example mesh pattern of FIG. 9 may have a dual-layer configuration where conductive lines 50J and 52J (represented in FIG. 9 by solid lines) are included in a first layer disposed on a side of a substrate, and conductive lines 50K and 52K (represented in FIG. 9 by dashed lines) are included in a second layer disposed on another side of the same substrate or on a side of another substrate. In the example of FIG. 9, dashed lines 50K and 52K represent conductive lines that may be part of a particular layer, and, in particular embodiments, the conductive lines of a corresponding mesh pattern may be continuous conductive-line segments that are not dashed or broken. Conductive lines 50K and 52K in FIG. 9 are represented by dashed lines only to visually distinguish them from conductive lines 50J and 52J. In particular embodiments, conductive lines 50 of a mesh pattern may be alternately disposed on the first or second layers of a dual-layer mesh pattern. In FIG. 9, conductive lines 50J may include a first group of every other line of conductive lines 50, and conductive lines 50J may be part of a first layer. Similarly, in FIG. 9, conductive lines 50K may include a second group (different from the first group) of every other line of conductive lines 50, and conductive lines 50K may be part of a second layer. As an example and not by way of limitation, if conductive lines 50 were sequentially identified by integers (e.g., 1, 2, 3, etc.), conductive lines 50J of a first layer may include all odd-numbered lines, and conductive lines 50K of a second layer may include all even-numbered lines. Similarly, in particular embodiments, conductive lines 52 of a mesh pattern may be alternately disposed on the first or second layers of a dual-layer mesh pattern. As an example and not by way of limitation, if conductive lines 52 were sequentially identified by integers, conductive lines 52J of a first layer may include all odd-numbered lines, and conductive lines 52K of a second layer may include all even-numbered lines. Although this disclosure describes and illustrates particular conductive lines disposed on particular layers of a multi-layer mesh pattern, this disclosure contemplates any suitable conductive lines disposed on any suitable layers of a multi-layer mesh pattern.

In particular embodiments, conductive lines 50 or conductive lines 52 of a dual-layer mesh pattern may have one or more portions disposed on a first layer and one or more portions disposed on a second layer of a dual-layer mesh pattern. In particular embodiments, a conductive line 50 or 52 may be separated into multiple distinct segments, where each segment is disposed on a first or second layer of a dual-layer mesh pattern. In particular embodiments, a conductive line 50 or 52 with multiple segments disposed on a first or second layer of a dual-layer mesh pattern may be viewed as a single, continuous line when seen from above a plane of the mesh pattern. As an example and not by way of limitation, a conductive line 50 may have three distinct portions: a first portion disposed on a first layer, a second portion disposed on a second layer, and a third portion disposed on a first layer. Although this disclosure describes and illustrates mesh patterns having particular conductive lines with particular portions disposed on one or more surfaces, this disclosure contemplates any suitable mesh patterns having any suitable conductive lines with any suitable portions disposed on any suitable number of surfaces.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
a touch sensor comprising a mesh pattern of electrically conductive material configured to extend across either a first display or a second display that is different from the first display, wherein:
the first display and the second display are separate displays;
the mesh pattern comprises a plurality of first lines and a plurality of second lines of the electrically conductive material, the first lines being substantially parallel to each other, the second lines being substantially parallel to each other;
the first display comprises a plurality of first-display pixels that each comprise a plurality of first-display sub-pixels arranged in repeating patterns along a first-display horizontal pixel axis and a first-display vertical pixel axis that is perpendicular to the first-display horizontal pixel axis, each of the first-display pixels having a first-display horizontal pixel pitch ($HPP_1$) along the first-display horizontal pixel axis and a first-display vertical pixel pitch ($VPP_1$) along the first-display vertical pixel axis, each of the first-display sub-pixels having a first-display horizontal sub-pixel pitch ($HSPP_1$) along the first-display horizontal pixel axis, and a first-display sub-pixel height ($SPH_1$) along the first-display vertical pixel axis;
the second display comprises a plurality of second-display pixels that each comprise a plurality of second-display sub-pixels arranged in repeating patterns along a second-display horizontal pixel axis and a second-display vertical pixel axis that is perpendicular to the second-display horizontal pixel axis, each of the second-display pixels having a second-display horizontal pixel pitch ($HPP_2$) along the second-display horizontal pixel axis and a second-display vertical pixel pitch ($VPP_2$) along the second-display vertical pixel axis, each of the second-display sub-pixels having a second-display horizontal sub-pixel pitch (HSPP$_2$) along the second-display horizontal pixel axis, and a second-display sub-pixel height (SPH$_2$) along the second-display vertical pixel axis;

the first-display pixels and the second-display pixels are substantially equal in size, wherein HPP$_1$ and HPP$_2$ are substantially equal, and VPP$_1$ and VPP$_2$ are substantially equal;

SPH$_2$ is greater than SPH$_1$;

the first lines are configured to extend across the first or second display at a first angle relative to the first-display horizontal pixel axis or the second-display horizontal pixel axis, respectively, wherein the first angle is within 1° of the arctangent of $^{H_c}/_{Hpp1}$, wherein H$_c$ is greater than SPH$_1$ and less than SPH$_2$; and the second lines are configured to extend across the first or second display at a second angle relative to the first-display horizontal pixel axis or the second-display horizontal pixel axis, respectively, wherein the second angle is within 1° of the arctangent of $^{VPP}1/(2 \times HSPP_1)$; and one or more computer-readable non-transitory storage media coupled to the touch sensor and embodying logic that is configured when executed to control the touch sensor.

2. The apparatus of claim 1, wherein H$_c$ is approximately equal to an average of SPH$_1$ and SPH$_2$.

3. The apparatus of claim 1, wherein:
the first angle is oriented counterclockwise relative to the first-display horizontal pixel axis or the second-display horizontal pixel axis; and
the second angle is oriented clockwise relative to the first-display horizontal pixel axis or the second-display horizontal pixel axis.

4. The apparatus of claim 1, wherein first lines that are adjacent to each other are separated from each other along the first-display horizontal pixel axis or the second-display horizontal pixel axis by a distance approximately equal to three times HPP$_1$.

5. The apparatus of claim 1, wherein second lines that are adjacent to each other are separated from each other along the first-display horizontal pixel axis or the second-display horizontal pixel axis by a distance approximately equal to 13/6 of HPP$_1$.

6. The apparatus of claim 1, wherein first lines that are adjacent to each other are separated from each other along the first-display horizontal pixel axis or the second-display horizontal pixel axis by a distance approximately equal to six times HPP$_1$.

7. The apparatus of claim 1, wherein second lines that are adjacent to each other are separated from each other along the first-display horizontal pixel axis or the second-display horizontal pixel axis by a distance approximately equal to 13/3 of HPP$_1$.

8. The apparatus of claim 1, wherein first lines that are adjacent to each other are separated from each other along the first-display horizontal pixel axis or the second-display horizontal pixel axis by a distance approximately equal to two times HPP$_1$.

9. The apparatus of claim 1, wherein:
the first-display horizontal pixel pitch is a width of each of the first-display pixels;
the first-display vertical pixel pitch is a height of each of the first-display pixels;
the first-display sub-pixel height is a height of each of the first-display sub-pixels; and
the second-display sub-pixel height is a height of each of the second-display sub-pixels.

10. The apparatus of claim 1, wherein the first-display sub-pixels are substantially rectangular.

11. The apparatus of claim 1, wherein one or more segments of one or more of the first or second lines are substantially sinusoidal.

12. The apparatus of claim 1, wherein:
HSPP$_1$ and HSPP$_2$ are substantially the same.

13. The apparatus of claim 12, wherein:
the first display has a first-display sub-pixel dead space width (DSW$_1$) along the first-display horizontal pixel axis;
the second display has a second-display sub-pixel dead space width (DSW$_2$) along the second-display horizontal pixel axis;
an average sub-pixel dead space width (DSW$_{AVG}$) is approximately equal to an average of DSW$_1$ and DSW$_2$;
the first display has a first-display sub-pixel width (SPW$_1$) along the first-display horizontal pixel axis;
the second display has a second-display sub-pixel width (SPW$_2$) along the second-display horizontal pixel axis;
an average sub-pixel width (SPW$_{AVG}$) is approximately equal to an average of SPW$_1$ and SPW$_2$; and
second lines that are adjacent to each other are separated from each other along the first-display horizontal pixel axis or the second-display horizontal pixel axis by a distance approximately equal to a sum of:
HPP$_1$;
HSPP$_1$;
DSW$_{AVG}$; and
½ of SPW$_{AVG}$.

14. A touch sensor comprising:
a mesh pattern of electrically conductive material configured to extend across either a first display or a second display that is different from the first display, wherein:
the first display and the second display are separate displays;
the mesh pattern comprises a plurality of first lines and a plurality of second lines of the electrically conductive material, the first lines being substantially parallel to each other, the second lines being substantially parallel to each other;
the first display comprises a plurality of first-display pixels that each comprise a plurality of first-display sub-pixels arranged in repeating patterns along a first-display horizontal pixel axis and a first-display vertical pixel axis that is perpendicular to the first-display horizontal pixel axis, each of the first-display pixels having a first-display horizontal pixel pitch (HPP$_1$) along the first-display horizontal pixel axis and a first-display vertical pixel pitch (VPP$_1$) along the first-display vertical pixel axis, each of the first-display sub-pixels having a first-display horizontal sub-pixel pitch (HSPP$_1$) along the first-display horizontal pixel axis, and first-display sub-pixel height (SPH$_1$) along the first-display vertical pixel axis;
the second display comprises a plurality of second-display pixels that each comprise a plurality of second-display sub-pixels arranged in repeating patterns along a second-display horizontal pixel axis and a second-display vertical pixel axis that is perpendicular to the second-display horizontal pixel axis, each of the second-display pixels having a second-display horizontal pixel pitch (HPP$_2$) along the second-display horizontal pixel axis and a second-display vertical pixel pitch (VPP$_2$) along the second-display vertical pixel axis, each of the second-display sub-pixels having a second-display horizontal sub-pixel pitch (HSPP$_2$) along the second-display horizontal pixel axis, and a second-display sub-pixel height (SPH$_2$) along the second-display vertical pixel axis;

the first-display pixels and the second-display pixels are substantially equal in size, wherein HPP$_1$ and HPP$_2$ are substantially equal, and VPP$_1$ and VPP$_2$ are substantially equal;

SPH$_2$ is greater than SPH$_1$;

the first lines are configured to extend across the first or second display at a first angle relative to the first-display horizontal pixel axis or the second-display horizontal pixel axis, respectively, wherein the first angle is within 1° of the arctangent of $^{H}c/_{Hpp1}$, wherein H$_c$ is greater than SPH$_1$ and less than SPH$_2$; and the second lines are configured to extend across the first or second display at a second angle relative to the first-display horizontal pixel axis or the second-display horizontal pixel axis, respectively, wherein the second angle is within 1° of the arctangent of $^{VPP1}/(2 \times HSPP_1)$.

15. The touch sensor of claim 14, wherein H$_c$ is approximately equal to an average of SPH$_1$ and SPH$_2$.

16. The touch sensor of claim 14, wherein:

the first angle is oriented counterclockwise relative to the first-display horizontal pixel axis or the second-display horizontal pixel axis; and the second angle is oriented clockwise relative to the first-display horizontal pixel axis or the second-display horizontal pixel axis.

17. The touch sensor of claim 14, wherein first lines that are adjacent to each other are separated from each other along the first-display horizontal pixel axis or the second-display horizontal pixel axis by a distance approximately equal to three times HPP$_1$.

18. The touch sensor of claim 14, wherein second lines that are adjacent to each other are separated from each other along the first-display horizontal pixel axis or the second-display horizontal pixel axis by a distance approximately equal to 13/6 of HPP$_1$.

19. The touch sensor of claim 14, wherein first lines that are adjacent to each other are separated from each other along the first-display horizontal pixel axis or the second-display horizontal pixel axis by a distance approximately equal to six times HPP$_1$.

20. The touch sensor of claim 14, wherein second lines that are adjacent to each other are separated from each other along the first-display horizontal pixel axis or the second-display horizontal pixel axis by a distance approximately equal to 13/3 of HPP$_1$.

* * * * *

UNITED STATES PATENT AND TRADEMARK OFFICE
CERTIFICATE OF CORRECTION

PATENT NO. : 9,304,617 B2
APPLICATION NO. : 14/031372
DATED : April 5, 2016
INVENTOR(S) : David Brent Guard et al.

Page 1 of 1

It is certified that error appears in the above-identified patent and that said Letters Patent is hereby corrected as shown below:

In the Claims

Col. 18, Ln. 58: After "and" and before "first-display" insert --a--.

Signed and Sealed this
Fourteenth Day of June, 2016

Michelle K. Lee
*Director of the United States Patent and Trademark Office*